(12) United States Patent
Smith

(10) Patent No.: US 7,268,174 B2
(45) Date of Patent: Sep. 11, 2007

(54) HOMOGENEOUS ALUMOXANE-LCT-EPOXY POLYMERS AND METHODS FOR MAKING THE SAME

(75) Inventor: James D. B. Smith, Monroeville, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 101 days.

(21) Appl. No.: 10/618,111

(22) Filed: Jul. 11, 2003

(65) Prior Publication Data

US 2005/0009958 A1    Jan. 13, 2005

(51) Int. Cl.
   *C08L 63/00*    (2006.01)
(52) U.S. Cl. .................. 523/435; 523/400; 523/457
(58) Field of Classification Search ............... 523/400, 523/435, 436, 437, 438, 439, 457, 458, 459; 428/413, 414, 396
   See application file for complete search history.

(56) References Cited

U.S. PATENT DOCUMENTS

| 3,369,947 | A | * | 2/1968 | Mertens et al. ............... 156/51 |
| 4,427,740 | A | * | 1/1984 | Stackhouse et al. ........ 428/324 |
| 4,806,806 | A | | 2/1989 | Hjortsberg et al. |
| 5,904,984 | A | | 5/1999 | Smith et al. |
| 6,190,775 | B1 | | 2/2001 | Smith et al. |
| 6,261,481 | B1 | | 7/2001 | Akatsuka et al. |
| 6,288,341 | B1 | | 9/2001 | Tsunoda et al. |
| 6,369,183 | B1 | | 4/2002 | Cook et al. |
| 6,384,152 | B2 | | 5/2002 | Smith et al. |

* cited by examiner

*Primary Examiner*—Michael J. Feely

(57) ABSTRACT

The present invention relates to homogeneous alumoxane-LCT-epoxy polymers and methods for making the same. The homogeneous alumoxane-LCT-epoxy polymers comprise alumoxane-containing sub-structures evenly dispersed and essentially completely co-reacted with the LCT-epoxy sub-structures. The alumoxane sub-structures are organically bonded to the LCT-epoxy sub-structures. This produces homogeneous alumoxane-LCT-epoxy polymers that are substantially free of particle wetting and micro-void formation, with improved thermal conductivity properties without compromising on other desired structural integrities.

3 Claims, 2 Drawing Sheets

HOMOGENEOUS ALUMOXANE-LCT-EPOXY POLYMERS AND METHODS FOR MAKING THE SAME

CROSS-REFERENCE TO RELATED APPLICATIONS

This application is related to US application "LCT-Epoxy Polymers with HTC-Oligomers and Method for Making the Same" by inventor James D. Smith, filed herewith and incorporated herein by reference.

BACKGROUND OF THE INVENTION

With the use of any form of electrical appliance, there is a need to electrically insulate conductors. With the push to continuously reduce in size and streamline all things electrical, there is a corresponding need to find better and more condensed insulators.

Epoxy resins have been used extensively in electrical insulators due to their practical benefit of being tough and flexible electrical insulators that can be easily adhered to surfaces. Traditional electrical insulators, such as mica or glass fibers, can be surface coated with these epoxy resins, which increases the material's strength, chemical resistance and electrically insulating properties.

Good electrical insulators, by their very nature, also tend to be good thermal insulators, which is not a desired effect. Thermal insulation, particularly for air-cooled electrical components, reduces the efficiency and durability of the components as well as the unit as a whole. It is desirable to produce insulators, such as groundwall insulators, having maximum electrical insulation while minimizing thermal insulation.

Improvements in epoxy resins have recently been made by using liquid crystal polymers. By mixing an epoxy resin with a liquid crystal polymer, a liquid crystal thermoset (LCT) epoxy resin is produced that contains polymers or monomers that have cross-linked properties and have significantly improved mechanical properties. See U.S. Pat. No. 5,904,984, which is incorporated herein by reference. A further benefit of LCTs is that they also have improved thermal conductivity over standard epoxy resins.

What makes LCT epoxy resins even more appealing is that they are also better able to conduct heat than a standard epoxy resin. U.S. Pat. No. 6,261,481, which is incorporated herein by reference, teaches that LCT epoxy resins can be produced with a thermal conductivity greater than that of conventional epoxy resins. For example, a standard Bisphenol A epoxy is shown to have thermal conductivity values of 0.18 to 0.24 watts per meter degree Kelvin (W/mK) in both the transverse (plane) and thickness direction. By contrast, an LCT epoxy resin is shown to have a thermal conductivity value, when used in practical applications, of no more than 0.4 W/mK in the transverse direction and no more than 0.9 W/mK in the thickness direction. However, the LCT epoxy resin lacks some physical properties, such as thermal stability and impregnating qualities.

Though these efforts benefit the art of electrical insulation, the field would benefit even more from the ability to transfer heat, without reducing the desired physical characteristics of the insulators. What is needed is an improved LCT epoxy resin, that has a greater thermal conductivity, but that does not compromise on electrical insulation or other structural integrities.

SUMMARY OF THE INVENTION

The present invention relates to homogeneous alumoxane-LCT-epoxy polymers and methods for making the same.

In one embodiment, the present invention relates to compositions of liquid crystal thermoset (LCT) epoxy resins having boehmite content in the range of 15-65% by weight, and a micro structure comprising a homogeneous dispersion of the boehmite in the LCT epoxy resin. The boehmite is essentially sufficiently reacted with the LCT-epoxy to provide a resulting polymer composition that is substantially free of particle wetting and micro-void formation. In this embodiment, the alumoxane-LCT-epoxy polymers have transverse thermal conductivity values of at least 0.50 W/mK at room temperature, and dielectric strengths of 1.2 kV/mil or greater.

In a particular embodiment, the boehmite content of the homogeneous alumoxane-LCT-epoxy polymers is 20-50% by weight. In a more specific embodiment, it is 25-40% by weight.

In another particular embodiment, the boehmite content is selected from carboxylate-alumoxanes.

In a particular embodiment, the homogeneous alumoxane-LCT-epoxy polymers have an anhydride content of 25-45% by weight.

In a particular embodiment, the homogeneous alumoxane-LCT-epoxy polymers are coated on an electrically insulating material.

In one embodiment the present invention relates to methods of making LCT epoxy resins. The method comprises mixing at least one LCT-epoxy resin and at least one boehmite material. This is then cured to produce the homogeneous alumoxane-LCT-epoxy polymers.

In a particular embodiment at least one anhydriding agent is mixed with the LCT-epoxy resins and boehmite materials.

In another particular embodiment the homogeneous alumoxane-LCT-epoxy polymers are coated onto an insulation material before being cured.

DETAILED DESCRIPTION OF THE INVENTION

Figure 1:
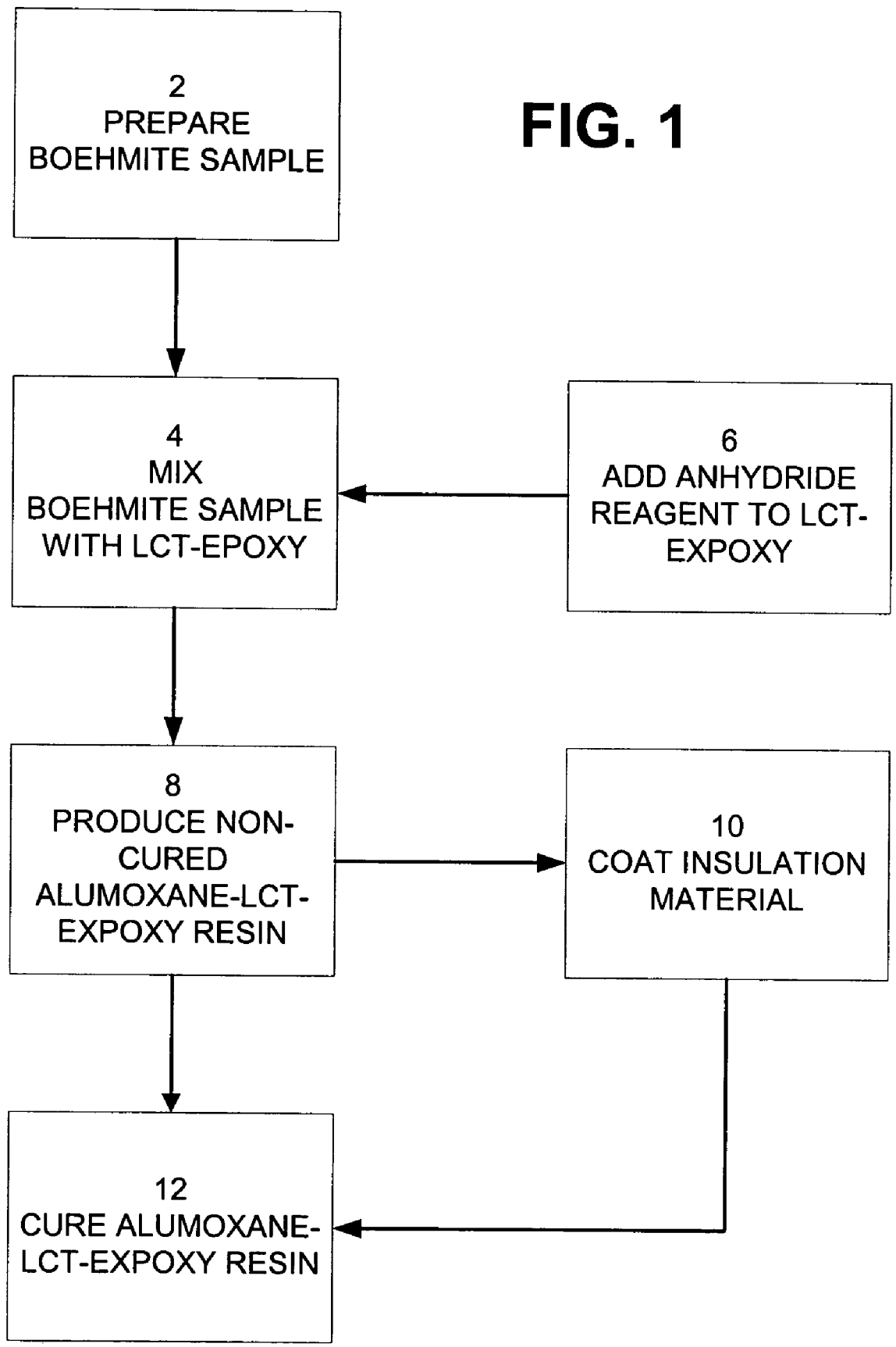
FIG. 1 is a flow chart of a process for making alumoxane-LCT-epoxy polymers according to an embodiment of the present invention.

The present invention relates to homogeneous alumoxane-LCT-epoxy polymers and methods for making the same.

In one aspect, the present invention provides methods of making homogeneous alumoxane-LCT-epoxy polymers with dielectric strengths of at least 1.2 kV/mil. Homogeneous in this sense refers to an even and uniform distribution of the components described in the production of the alumoxane-LCT-epoxy. The method comprises the steps of mixing at least one LCT-epoxy resin and at least one boehmite material. The ratio of boehmite material to LCT-epoxy resin can be in the range of between 3:17 and 13:7 by weight boehmite material to LCT-epoxy resin. The dispersion of the boehmite material is uniform and the co-reactivity of the boehmite material with the LCT-epoxy resin is essentially complete. This mixture is then cured to produce the homogeneous alumoxane-LCT-epoxy polymers.

In a particular embodiment, the boehmite material used is at least partially a carboxylate-alumoxane, and even more particularly embodiment the carboxylate-alumoxane is 4-hydroxybenoate-alumoxane. Though the ratio of boehmite material to LCT-epoxy resin given above will produce polymers with between 15-65% by weight of the boehmite material, in a particular embodiment, this percentage is 20-50% by weight boehmite material in the resulting epoxy polymers. The boehmite material in this instance can be more properly defined as the inherent alumoxane portion (or sub-structure) of the finished homogeneous alumoxane-LCT-epoxy polymers. In an even more specific embodiment, the weight percentage of the alumoxane portion of the resulting polymers is 25-40%.

Though there are a variety of methods known in the art for processing LCT-epoxy resins, a particular method is warming the sample at approximately 60° C. until the LCT-epoxy resin is clear. Likewise, when mixing the LCT-epoxy resin and the boehmite material, one method is to warm to approximately 60° C. until clear.

In a particular embodiment, the present invention involves adding at least one anhydriding agent to either the LCT-epoxy resin or the boehmite material or both. Therefore the homogeneous alumoxane-LCT-epoxy polymers described are more properly termed as homogeneous alumoxane-LCT-epoxy-anhydride polymers. When this embodiment is performed, the anhydriding agents are approximately 25-45% by weight of the resulting homogeneous alumoxane-LCT-epoxy-anhydride polymers. Though a variety of anhydriding agents known in the art can be used, particular embodiments include using 1-methylhexahydrophthalic anhydride or 1-methyltetrahydrophthalic anhydride.

A particular application of the present invention is coating at least one electrical insulator with the homogeneous alumoxane-LCT-epoxy polymers to produce an electrical insulator with improved properties, such as improved thermal conductivity. The coating of the electrical insulator will take place before the curing of the alumoxane-LCT-epoxy polymers. Particular methods of curing as well as particular insulating materials, such as mica/glass tape, are described more below.

In another aspect, the present invention comprises homogeneous alumoxane-LCT-epoxy polymers. Unlike LCT-epoxy polymers of the prior art, the homogeneous alumoxane-LCT-epoxy polymers of the present invention comprise at least one alumoxane containing sub-structure evenly dispersed and essentially completely co-reacted with at least one LCT-epoxy sub-structure. As shown in later examples, the alumoxane sub-structure is organically bonded to the LCT-epoxy sub-structure. This produces homogeneous alumoxane-LCT-epoxy polymers that are substantially free of particle wetting and micro-void formation. The thermal conductivity of the resulting polymers in the transverse direction is at least 0.50 W/mK and in the thickness direction is at least 0.99 W/mK in an environment of 25° C. Further, the dielectric strength of the resulting polymers is at least 1.2 kV/mil. The approximate weight percentage of the alumoxane sub-structure in the resulting homogeneous alumoxane-LCT-epoxy polymers is 15-65%.

As will be described, the boehmite materials used to produce the alumoxane sub-structure can vary, which will result in a variety of possible alumoxane sub-structures in the resulting polymers. However, a particular alumoxane sub-structure is a carboxylate-alumoxane, and an even more particular one is 4-hydroxybenoate-alumoxane.

The homogeneous alumoxane-LCT-epoxy polymers described may also contain at least one anhydride. If present, this anhydride may comprise approximately 25-45% by weight of the homogeneous alumoxane-LCT-epoxy polymers.

Either the homogeneous alumoxane-LCT-epoxy polymers or the homogeneous alumoxane-LCT-epoxy-anhydride polymers may be produced as a coating on insulative materials, such as a mica/glass insulating tape.

Synthesis of Boehmites

Boehmite as used herein refers to any nano-sized alumina containing materials that can be reacted with an LCT epoxy resin, according to the present invention, to produce a homogeneous alumoxane-LCT-epoxy polymers. The boehmite, therefore, refers to the source of the alumina in the alumoxane-LCT-epoxy, and may at times be used interchangeable with the alumina containing pre-cursors or to the alumoxane sub-structure of the alumoxane-LCT-epoxy. Though there is no intention to be limited to a specific type of boehmite, or a specific method of synthesizing a boehmite-containing molecule for the purposes of reacting with LCT-epoxy resin, a carboxylic acid of alumoxane is a particular embodiment.

A variety of carboxylic acids will suit this embodiment, such as allopathic and aromatic carboxylic acids. An example of an aromatic carboxylic acid to produce a carboxylate-alumoxane according to this embodiment can be show as:

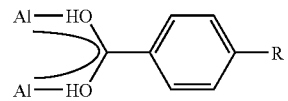

The Al is nano-sized alumina, and is connected carboxylate-alumoxane that has a functionalized group R, which can be a variety of reactive groups, including but not limited to OH, $NH_2$, or another carboxylic group which might or might not include the benzene ring shown if an aliphatic group is selected. The following is a particular method of making a suitable boehmite as used in the synthesis of homogeneous alumoxane-LCT-epoxy polymers:

A nano-sized boehmite may be prepared by hydrolyzing of an aluminum tris(sec-butoxide) at 90° C. A typical procedure uses 250 g of aluminum tris(sec-butoxide) hydrolyzed in 1.5 L of distilled water. The particle size of the boehmite produced under these conditions is less than 70 nm. Water can be removed by evaporation to give a concentrated solution of boehmite, typically 10-20% by weight in water.

The nano-sized boehmite is then synthesized into a 4-hydroxybenzoate-alumoxane by dispersing the nano-sized boehmite into distilled water. Following the starting 250 g of aluminum mentioned above, approximately 180 g of boehmite is dispersed into 2 L of water. This is then mixed with 4-hydoxybenzoic acid (276 g) and heated to 90° C. overnight. The mixture is then cooled to room temperature and the water removed under vacuum using a rotary evaporator to produce the 4-hydroxybenzoate-alumoxane. The 4-hydroxybenzoate-alumoxane is then powdered as necessary.

Though the below examples use powdered carboxylate-alumoxane, it will be apparent to one of ordinary skill in the art that the boehmite may be delivered to the reaction in other forms, such as in solution.

Synthesis of Alumoxane-LCT-Epoxy Polymers

The synthesis of alumoxane-LCT-epoxy polymers according to the present invention may similarly be done by a variety of methods that will be apparent to one of ordinary skill in the art after review of the procedures contained herein. A particular method, however, comprises:

A Biphenol LCT-epoxy resin (particularly Shell Chemical RSS-1407), is warmed to 60° C. until clear. For the purposes of example, a sample size of 4.0 g will be used to show the approximate quantity relations with other ingredients. To this, 1.5 g of powdered 4-hydroxybenzoate-alumoxane is added and mixed for approximately 30 minutes, until the solution is clear. 0.1 g of zinc naphthenate or 0.05 g of chromium acetylacetonate is added as a cure catalyst and mixed for an additional five minutes. The solution is then poured into a dish and placed in an oven at 150° C. for four hours. After this the sample will be fully cured as indicated by a high surface hardness value.

This reaction may be summarized as follows:

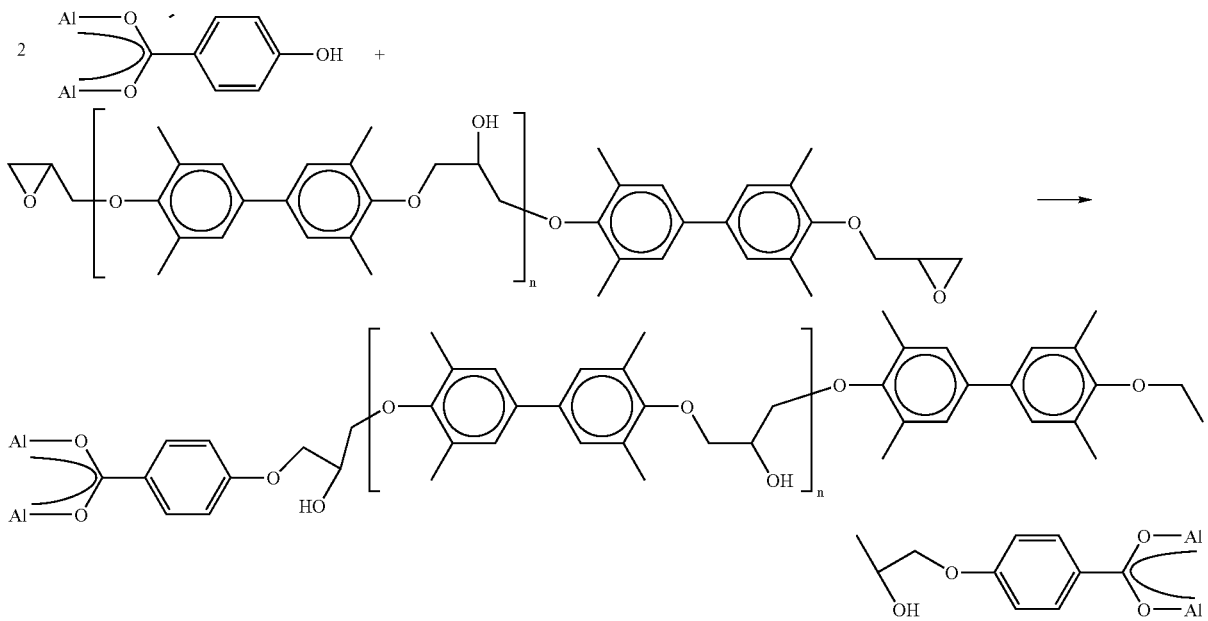

The two carboxylate-alumoxanes with an OH functional group are reacted with a biphenol LCT-epoxy chain that contains n repeating biphenol units. The result is an alumoxane-LCT-epoxy cross-linked polymer. The boehmite particles become organically bonded to the LCT-epoxy chain. Though this example uses biphenol LCT-epoxy, this reaction could be performed with any variety of LCT, alone or in combination. Examples of other LCTs can be found in U.S. Pat. No. 5,904,984, which is incorporated herein by reference.

The synthesis of the alumoxane-LCT-epoxy polymers by this example produces polymers with approximately 27% by weight carboxylate-alumoxane. The remaining percentage is primarily the LCT-epoxys with a small amount of accelerants and other materials. Though this is one embodiment of the present invention, the carboxylate-alumoxane content may be anywhere from approximately 15-65% by weight. With a particular embodiment being from 20-50% by weight and an even more specific embodiment of 25-40% by weight.

Synthesis of Alumoxane-LCT-Epoxy-Anhydride Polymers

Similar to the synthesis of the alumoxane-LCT-epoxy polymers, an example of the synthesis of an alumoxane-LCT-epoxy-anhydride polymers comprises:

A 4.0 g sample of biphenol LCT-epoxy resin is added to 4.0 g of 1-methyltetrahydrophthalic anhydride or 1-methylhexahydrophthalic anhydride and warmed to 60° C. while being stirred. After the solution is clear, 4-hydroxybenzoate-alumoxane (3.0 g) is added to the solution and stirred at 60° C. until once again clear. 0.05 g of chromium acetylacetonate or 0.1 g of zinc naphthenate is then added as a cure accelerator and mixed for an additional five minutes. The solution is then poured into a dish and placed in an oven at 150° C. for four hours. After this the sample will be fully cured as indicated by a high surface hardness value.

The use of the anhydride components adds additional reactivity to this reaction, aiding the carboxylate-alumoxanes' co-reactivity with the LCT-epoxies. Further, the resulting polymers are more fluid, with improved insulative properties. In this example the anhydrides make up approximately 36% by weight of the final alumoxane-LCT-epoxy-anhydride polymers. Though this is one embodiment of the present invention, the anhydride content may be anywhere from approximately 25-45% by weight. In this example, the overall percentage of carboxylate-alumoxane is not changed from the above example. This might not always be the case, and the addition of anhydride might reduce the overall percentage of alumina in the resulting polymers.

One of the key features of forming alumoxane-LCT-epoxy polymers or alumoxane-LCT-epoxy-anhydride polymers by the methods of the present invention, is that the resulting polymers have an increased thermal conductivity, while retaining that which makes them valuable in the coating of electrical insulators. Therefore, the polymers of the present invention have a thermal conductivity value of at least 0.50-0.55 W/mK in the transverse direction. The dispersion of alumoxane in the LCT-epoxy resin is uniform and its co-reactivity therewith is complete. The polymers are not subject to particle wetting or micro-void formation, and the resin retains its adhesive properties, particularly for the coating of electrical insulators.

As stated, one of the primary uses for homogeneous alumoxane-LCT-epoxy polymers is to coat electrical insulators. Materials such as mica and glass fibers make good electrical insulators, but by themselves lack toughness, resiliency and thermal conductivity. Though, as mentioned earlier, it has been known to coat these insulators in an epoxy resin to improve on their properties, increasing thermal conductivity while maintaining electrical insulation is problematic. The present invention, when used to coat these insulators, improves their thermal conductivity without appreciably reducing the electrical insulation.

For example, a bisphenol A-diglycidyl ether, which is a standard epoxy in the art, has a thermal conductivity value of 0.19 W/mK in the transverse direction and 0.19 W/mK in the thickness direction as well, when operating in an environment of approximately 25° C. Under similar conditions, an alumoxane-LCT-epoxy-anhydride polymer has a transverse thermal conductive value of at least 0.50 W/mK and a thickness value of at least 0.99 W/mK. The transverse verses thickness directions are determined by the epoxy structure. Epoxies such as alumoxane-LCT-epoxy-anhydride form crystalline microstructures that have a layered nature. Transverse refers to following the plane of the layer, while thickness is perpendicular to it. By transferring heat quicker, a power generator can produce more power and run more efficiently. New electrical appliances may be made with improved insulators according to the present invention, or old ones may be easily retrofitted, thereby increasing the efficiency of these devices as well as similar products.

This enhanced thermal conductivity is achieved without compromising on electrical insulation or other structural integrities. The dielectric strength of the alumoxane-LCT-epoxy polymers is 1.2 kV/mil or greater.

As will be apparent to one of ordinary skill in the art, the alumoxane-LCT-epoxy polymers can be applied to materials, whether an electrical insulator or otherwise, prior to being cured. There are many methods of coating materials with epoxy resins and then curing the product. One such method is vacuum pressure impregnation (VPI). This method is used on devices such as stator conductor coils. A mica/glass insulating tape is applied to the coils, then the coils are placed in a vacuum vessel and a vacuum is applied. After a period of time, resin is admitted to the coils to impregnate them. Pressure is applied to force the resin in and minimize voids, which will affect conductivity. After this is completed, the coils are heated to cure the resin. The resin may contain an accelerator or the tape may have one in it. A variation of this, global VPI involves the process where dry insulated coils are wound, and the then whole stator is vacuum pressure impregnated rather than the individual coils.

FIG. 1 is a flow chart summarizing aspects and particular embodiments of the present invention. The making of alumoxane-LCT-epoxy polymers begins mixing of at least one LCT-epoxy and at least one boehmite material. A particular embodiment shown here, however, begins with adding of suitable boehmite sample 2 to an LCT-epoxy 4. Boehmite refers to a nano-sized alumina material capable of being reacted with the LCT-epoxy resins. A particular type of boehmite material is carboxylate-alumoxane with a suitable functionalized group, such as OH. The boehmite material may be prepared in a variety of methods known in the art, such as being in powdered form or in solution. The LCT-epoxy 4 is prepared for mixing with the boehmite sample, which typically involves heating. If it is desired to produce an alumoxane-LCT-epoxy-anhydride resin, then at least one anhydride reagent 6 is added to the LCT-epoxy. In the examples given above, the adding of the anhydride reagent to the LCT-epoxy occurs before the addition of the boehmite sample, but this need not necessarily be the case. The results are, depending on whether or not the anhydride reagent is added, non-cured alumoxane-LCT-epoxy resins or a non-cured alumoxane-LCT-epoxy-anhydride resins 8. At this point the resin may be cured 12 by a variety of methods known in the art. However, a common application of the present invention is expected to be the coating of electrical insulation materials, in which case the resin is coated on these materials prior to being cured 10.

Figure 2:
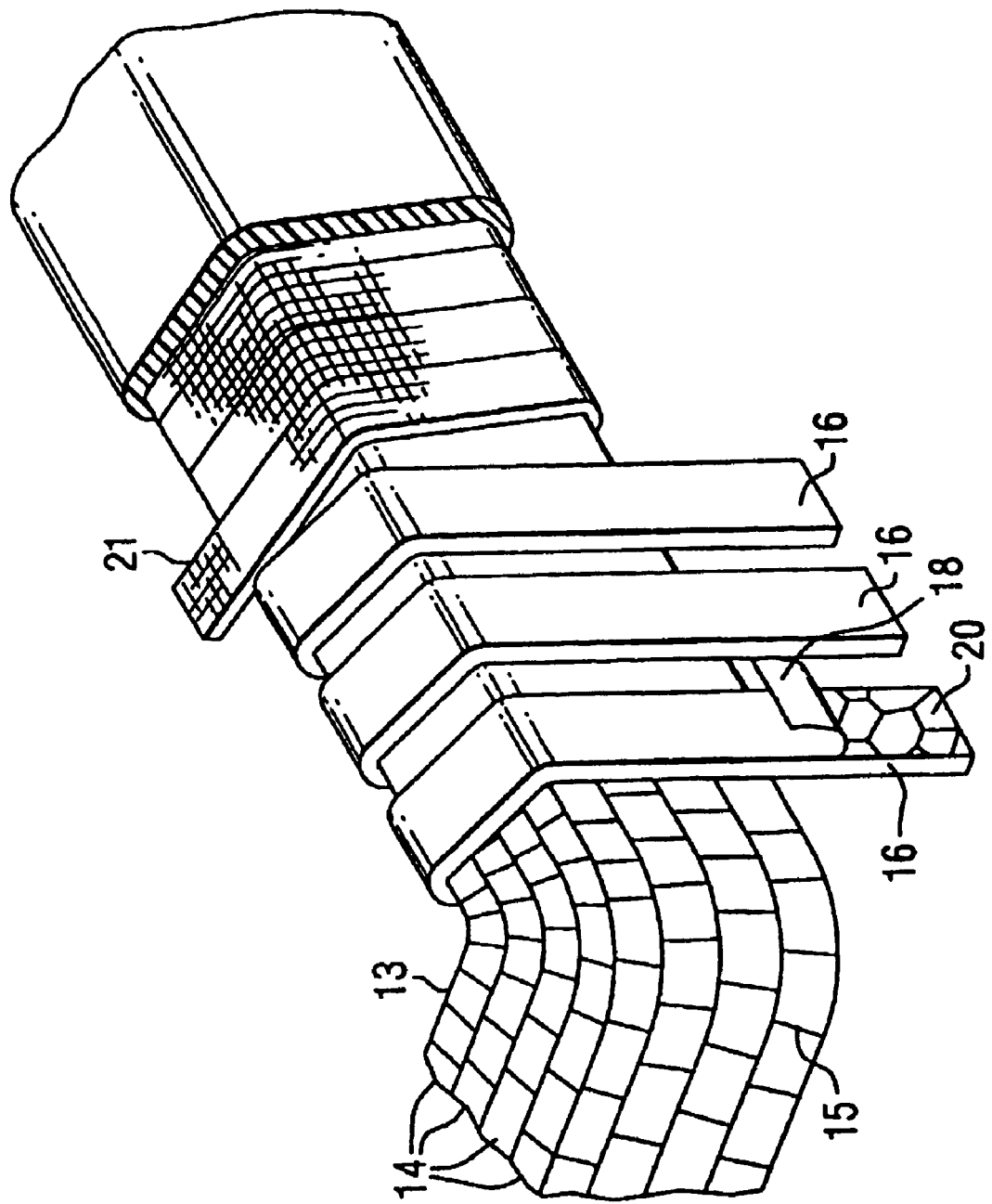
FIG. 2 shows an application for the alumoxane-LCT-epoxy polymers of the present invention for use in groundwall insulation.

A non-limiting example of an electrical insulation material used with the present invention is shown in FIG. 2. Illustrated here is a coil 13, comprising a plurality of turns of conductors 14. Each turn of the conductor 14 consists essentially of a copper bar or wire wrapped with a turn insulation 15. The turn insulation 15 is prepared preferably from a fibrous sheet or strip which may impregnated with the alumoxane-LCT-epoxy resin of the present invention, or alternatively another type of resin known in the prior art. The turn insulation 15 may be not adequate alone to withstand the severe voltage gradients that will be present between the conductor and ground when the coil is installed in a high-voltage generator. Therefore, ground insulation for the coil is provided by wrapping one or more layers of composite mica tape 16 about the turn 14.

Such a mica-tape 16 comprises a pliable backing sheet 18 of, for example, poly-ethylene glycol terephthalate or glass fabric mat, having a layer of mica flakes 20 bonded thereto the alumoxane-LCT-epoxy resin of the present invention. The tape 16 may be applied half lapped, abutted or in any other suitable manner. Generally, multiple layers of the mica tape 16 are wrapped about the coil with sixteen or more layers generally being used for high voltage coils. The number of layers may be decreased depending on the power of the generator and the effectiveness of the insulator as both in both its abilities to insulate electrically and conduct heat. To impart better abrasion resistance and to secure a tighter insulation, a wrapping of an outer tape 21 of a tough fibrous material, for example, glass fiber, asbestos or the like may be applied to the coil.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. A method of increasing the thermal conductivity of an electrically insulating epoxy material without compromising the electrical insulating properties of the material, the method comprising:

stirring an LCT-epoxy resin comprising a crystalline microstructure having a layered nature with an anhydriding agent at approximately 60° C. until a clear LCT-epoxy anhydride solution is formed;

after the solution is clear, adding a boehmite material into the clear solution and stirring at approximately 60° C., until the solution is again clear to form a uniform dissolution of the boehmite material substantially free of particle wetting and with essentially complete co-reactivity of the boehmite material with the LCT-epoxy anhydride; and adding an accelerator and curing the solution;

the method effective to produce homogeneous alumoxane-LCT-epoxy-anhydride polymers that retain the layered nature of the LCT-epoxy resin and are substantially free of micro-void formation and that exhibit a dielectric strength of at least 1.2 kV/mil while at the same time exhibiting thermal conductivity of at least 0.50 W/mK in a transverse direction and at least 0.99 W/mK in a thickness direction in an environment of 25° C.

2. The method of claim 1, further comprising dissolving zinc naphthenate into the solution as the accelerator.

3. A homogeneous alumoxane-LCT-epoxy anhydride polymer produced by the method of claim 1 and comprising a crystalline microstructure having a layered nature and exhibiting a dielectric strength of at least 1.2 kV/mil while at the same time exhibiting thermal conductivity of at least 0.50 W/mK in a direction transverse to layers of the microstructure and at least 0.99 W/mK in a thickness direction across the layers of the microstructure in an environment of 25° C.

* * * * *